United States Patent
Mahmud

(10) Patent No.: US 11,525,490 B1
(45) Date of Patent: Dec. 13, 2022

(54) POWER TRANSMISSION DEVICE HAVING A FRICTION CLUTCH AND A CONTROLLER CONFIGURED TO DETERMINE AN APPROXIMATED TEMPERATURE OF THE FRICTION CLUTCH AND RESPONSIVELY CONTROL THE FRICTION CLUTCH

(71) Applicant: AMERICAN AXLE & MANUFACTURING, INC., Detroit, MI (US)

(72) Inventor: Syeda F. Mahmud, Sterling Heights, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/706,904

(22) Filed: Mar. 29, 2022

Related U.S. Application Data

(60) Provisional application No. 63/316,698, filed on Mar. 4, 2022.

(51) Int. Cl.
*F16D 48/10* (2006.01)

(52) U.S. Cl.
CPC ...... *F16D 48/10* (2013.01); *F16D 2500/1045* (2013.01); *F16D 2500/30405* (2013.01); *F16D 2500/30406* (2013.01); *F16D 2500/30407* (2013.01); *F16D 2500/30412* (2013.01); *F16D 2500/3122* (2013.01); *F16D 2500/5102* (2013.01); *F16D 2500/70408* (2013.01); *F16D 2500/70684* (2013.01)

(58) Field of Classification Search
None
See application file for complete search history.

(56) References Cited

U.S. PATENT DOCUMENTS 6,006,149 A * 12/1999 Salecker ............... F16D 48/066
701/87
7,445,106 B2 11/2008 Capito
7,743,899 B2 6/2010 Capito
(Continued)

FOREIGN PATENT DOCUMENTS

| DE | 102009041412 | 4/2010 |
|---|---|---|
| WO | WO 2005057039 | 6/2005 |
| WO | WO 2012142277 | 10/2012 |

*Primary Examiner* — Timothy Hannon
(74) *Attorney, Agent, or Firm* — Burris Law, PLLC

(57) ABSTRACT

A power transmission device includes a friction clutch, an actuator, and a controller configured to determine an approximated temperature change of the friction clutch. The controller is configured to determine a current power state of the friction clutch, determine a desired power state change based on the current power state and a previous power state, determine a plurality of thermal coefficients based on a thermal coefficient model, the desired power state change, and a set of operation variables, determine an approximated temperature change of the friction clutch based on the thermal coefficients and a friction clutch temperature model, determine an approximated clutch temperature based on the approximated temperature change and a contemporaneous value of an device ambient temperature, and control operation of the actuator based at least on the approximated clutch temperature.

20 Claims, 11 Drawing Sheets

(56) References Cited

U.S. PATENT DOCUMENTS

| | | | |
|---|---|---|---|
| 7,747,366 B2 | 6/2010 | Karlsson | |
| 8,016,093 B2 | 9/2011 | Capito | |
| 8,083,041 B2 | 12/2011 | Capito et al. | |
| 8,197,386 B2 | 6/2012 | Capito | |
| 8,224,537 B2 | 7/2012 | Olsson et al. | |
| 8,311,717 B2 | 11/2012 | Eberhard et al. | |
| 8,897,979 B2 | 11/2014 | Hebbale et al. | |
| 8,983,746 B1 * | 3/2015 | Song | F16D 48/06 701/68 |
| 9,028,358 B2 | 5/2015 | Valente et al. | |
| 9,174,573 B1 * | 11/2015 | Pietron | F16D 23/12 |
| 10,703,203 B2 | 7/2020 | Legault et al. | |
| 2003/0150685 A1 | 8/2003 | Iida et al. | |
| 2011/0257838 A1 * | 10/2011 | Olsson | F16H 61/688 701/33.4 |
| 2012/0261228 A1 | 10/2012 | Chen et al. | |
| 2013/0253784 A1 * | 9/2013 | MacMillian | F02D 29/02 701/67 |
| 2016/0041066 A1 * | 2/2016 | Patenaude | G01M 13/022 702/130 |
| 2018/0231065 A1 | 8/2018 | Buchanan | |
| 2019/0195292 A1 | 6/2019 | Pan et al. | |
| 2021/0326496 A1 * | 10/2021 | Lee | G06F 30/15 |
| 2021/0348675 A1 | 11/2021 | Zink | |

\* cited by examiner

POWER TRANSMISSION DEVICE HAVING A FRICTION CLUTCH AND A CONTROLLER CONFIGURED TO DETERMINE AN APPROXIMATED TEMPERATURE OF THE FRICTION CLUTCH AND RESPONSIVELY CONTROL THE FRICTION CLUTCH

CROSS-REFERENCE TO RELATED APPLICATIONS

This application claims the benefit of U.S. Provisional Patent Application No. 63/316,698 filed Mar. 4, 2022, the disclosure of which is incorporated by reference as if fully set forth in detail herein.

FIELD

The present disclosure generally relates to a power transmission device having a friction clutch and a controller that is configured to determine an approximated temperature of the friction clutch and responsively control the friction clutch.

BACKGROUND

This section provides background information related to the present disclosure which is not necessarily prior art.

It is fairly common for power transmitting devices, such as power take-off units, transfer cases, differentials, and axle assemblies, to employ a friction clutch for controlling the amount of rotary power that is transmitted between rotary input and output members. Friction clutches employ a clutch pack having two sets of lamella or plates that are interleaved with one another and which are each non-rotatably coupled to an associated one of the rotary input and output members. An actuator is employed to exert a compressive force on the clutch pack to frictionally engage the two sets of plates to one another to thereby resist relative rotation. The amount of torque that is capable of being transmitted through the friction clutch is generally proportional to the magnitude of the compressive force that is exerted by the actuator. In situations where an instantaneous torque differential between the rotary input and rotary output exceeds an instantaneous or present torque transmitting capacity of the friction clutch, one set of the plates will rotate relative to the other set of plates, which can generate significant heat given the magnitude of the friction between adjacent plates. Extreme temperatures in a friction clutch can damage not only the plates, which tend to be formed of relatively thin steel, but could also adversely affect the tribological attributes of the plates. Consequently, it is fairly common to employ pressurized lubrication to lubricate and cool the friction clutch, as well as to monitor the temperature of the friction clutch using data from a temperature sensor that is mounted to the friction clutch.

Modern requirements for lower costs, higher efficiency and (reduced) packaging space have tended to further emphasize the need for thermal management of the friction clutch, while simultaneously creating pressure to remove temperature sensors that directly sense the temperature of the friction clutch (in an effort to lower the cost of the power transmitting component). While various algorithms have been developed to determine the temperature of a friction clutch without the use of a dedicated temperature sensor, these algorithms generally appear to be based on excessively simplified assumptions and generalizations and consequently, do not appear to be capable of providing sufficiently accurate estimates of temperature over a complete range of operating conditions.

SUMMARY

This section provides a general summary of the disclosure and is not a comprehensive disclosure of its full scope or all of its features.

In one form, the present disclosure is directed to a power transmission device that includes a friction clutch, an actuator, and a controller. The friction clutch has a clutch pack and an apply plate, where the apply plate is movable along an axis. The actuator has an output member that is movable along the axis between a first position and a second position. The output member, the apply plate, and the clutch pack are disposed in a force transmission path. The output member is movable along the axis from the first position to the second position to apply relatively more force through the force transmission path onto the clutch pack. The controller is configured to determine a current power state of the friction clutch, determine a desired power state change based on the current power state and a previous power state, and determine a plurality of thermal coefficients based on a thermal coefficient model, the desired power state change, and a set of operation variables. The plurality of thermal coefficients are indicative of at least two operation variables in the set of operation variables, and the at least two operation variables have a non-linear thermal influence on thermal properties of the friction clutch. The controller is further configured to determine an approximated temperature change of the friction clutch based on the thermal coefficients and a friction clutch temperature model, determine an approximated clutch temperature based on the approximated temperature change and a contemporaneous value of a device ambient temperature, and control operation of the actuator based at least on the approximated clutch temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5A:
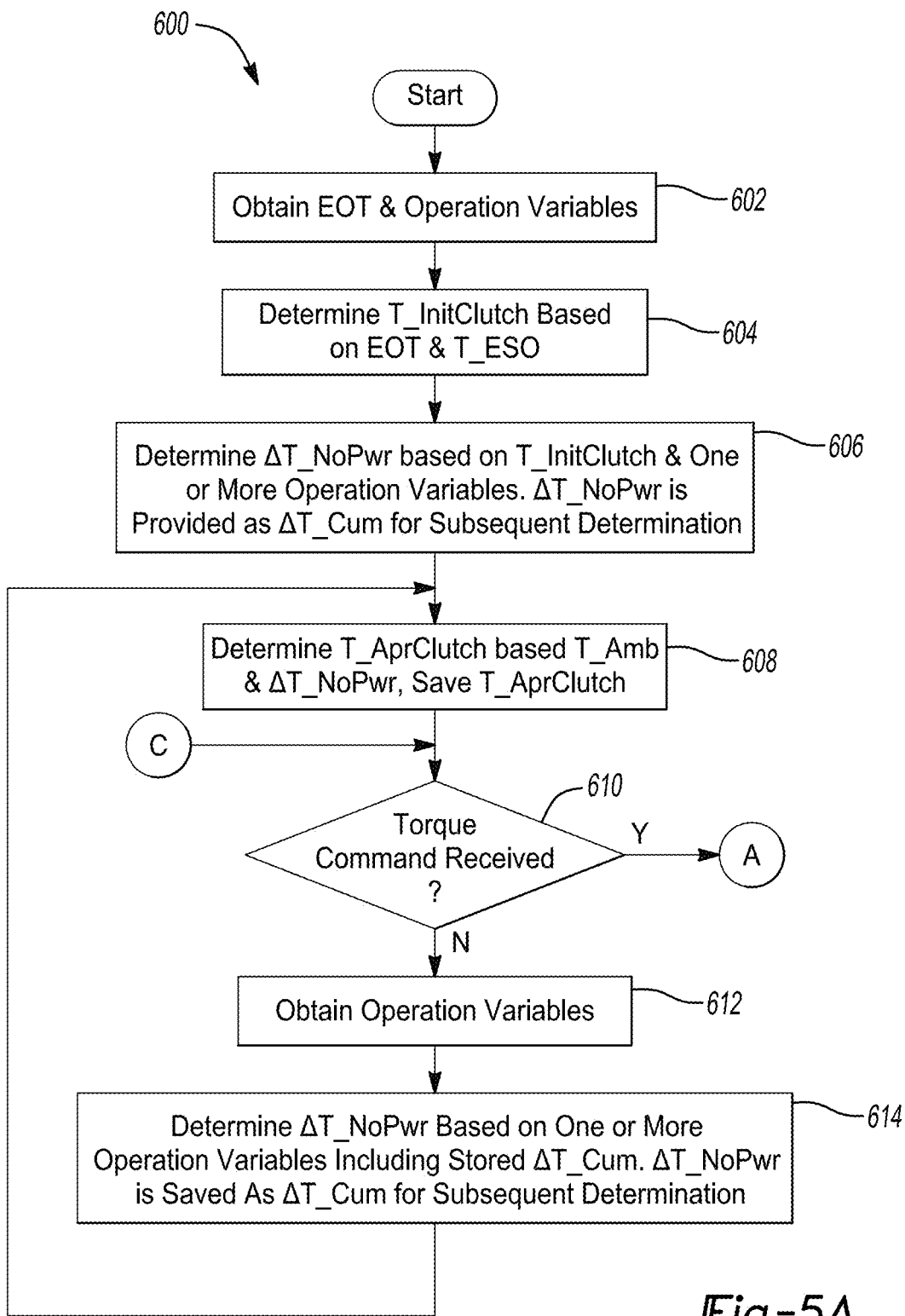
Figure 5B:
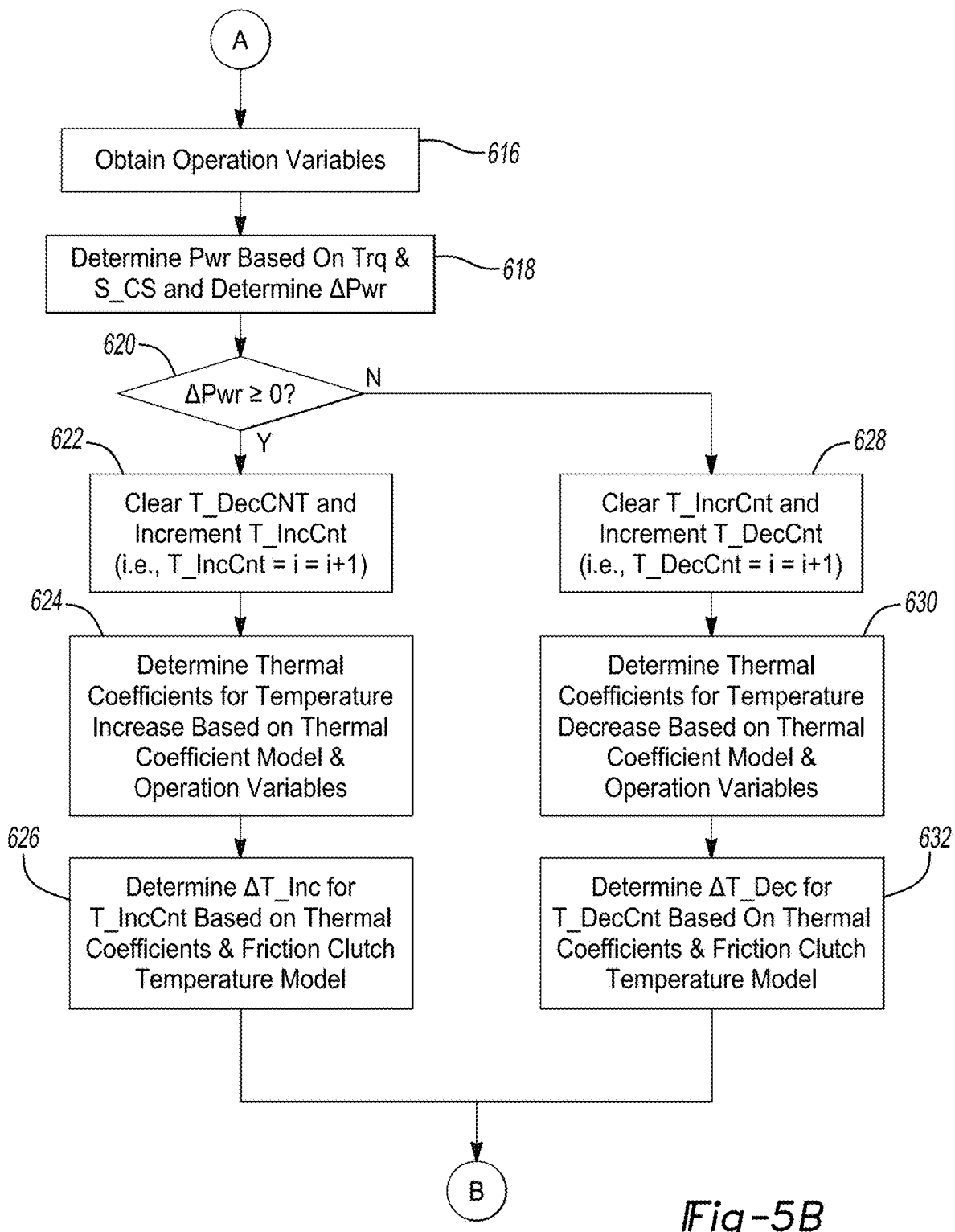
Figure 5C:
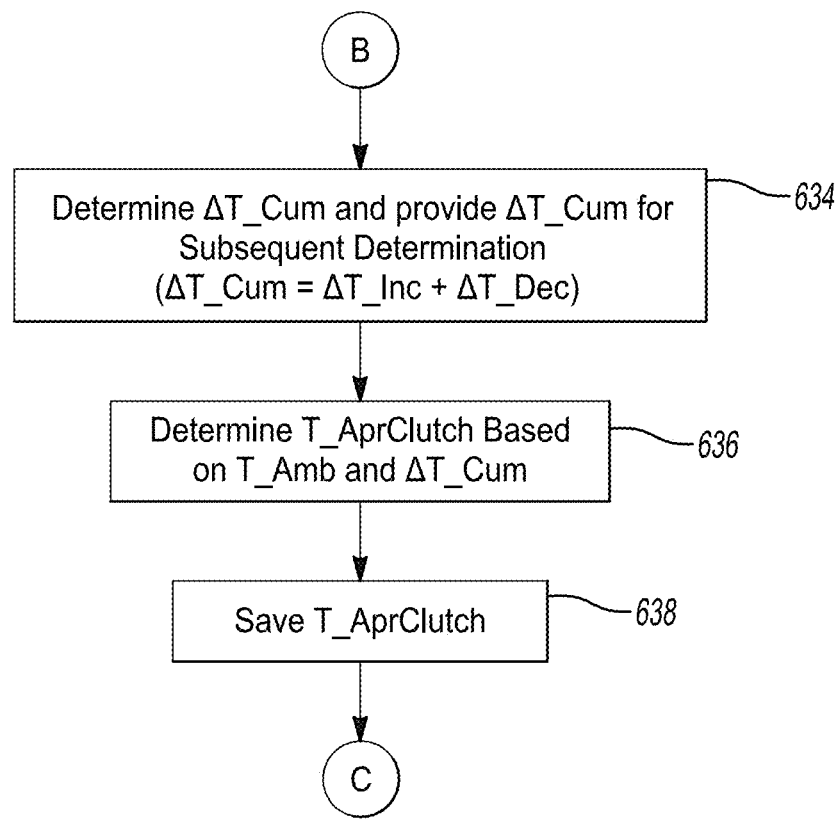
Figure 6:
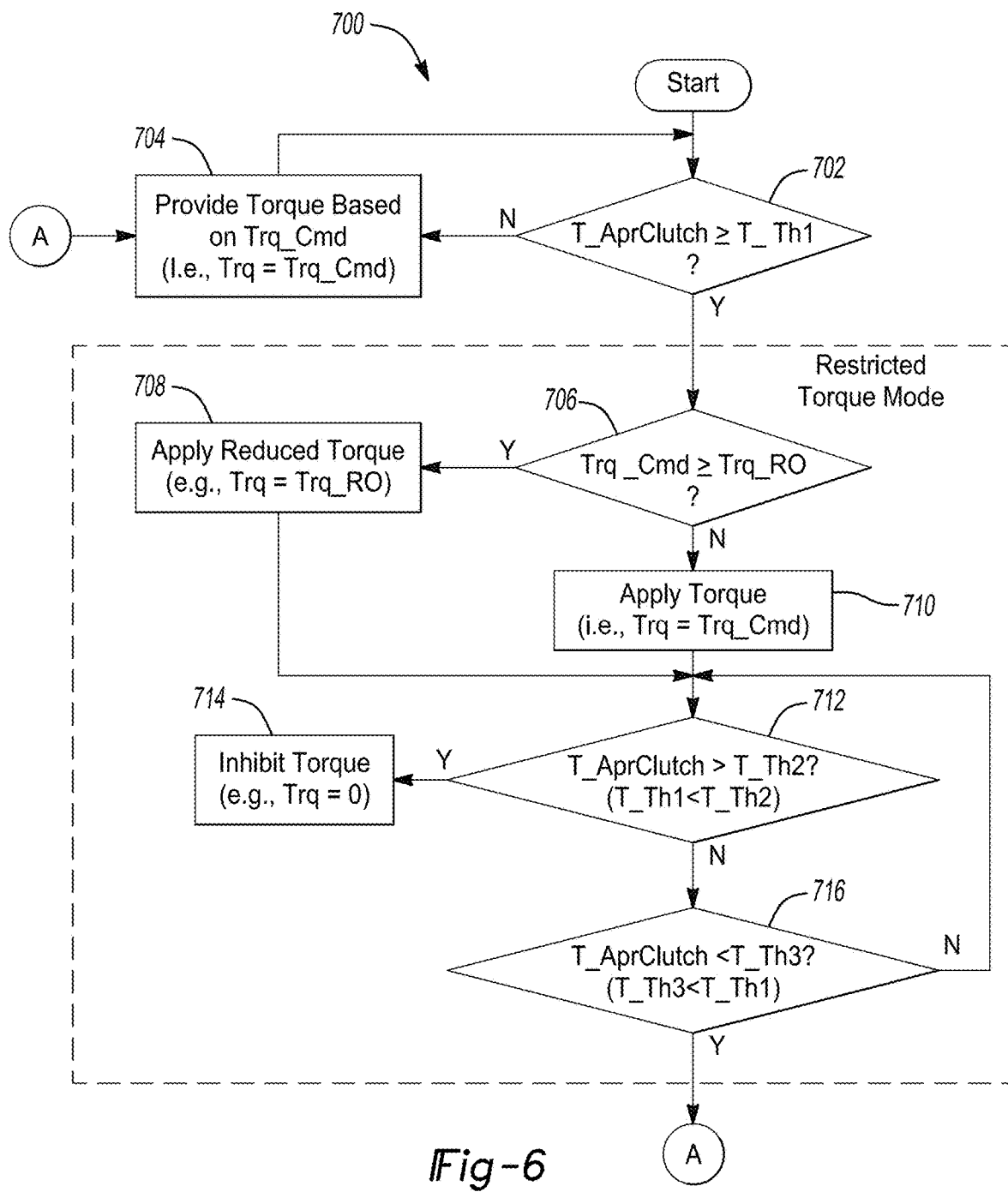
Figure 7:
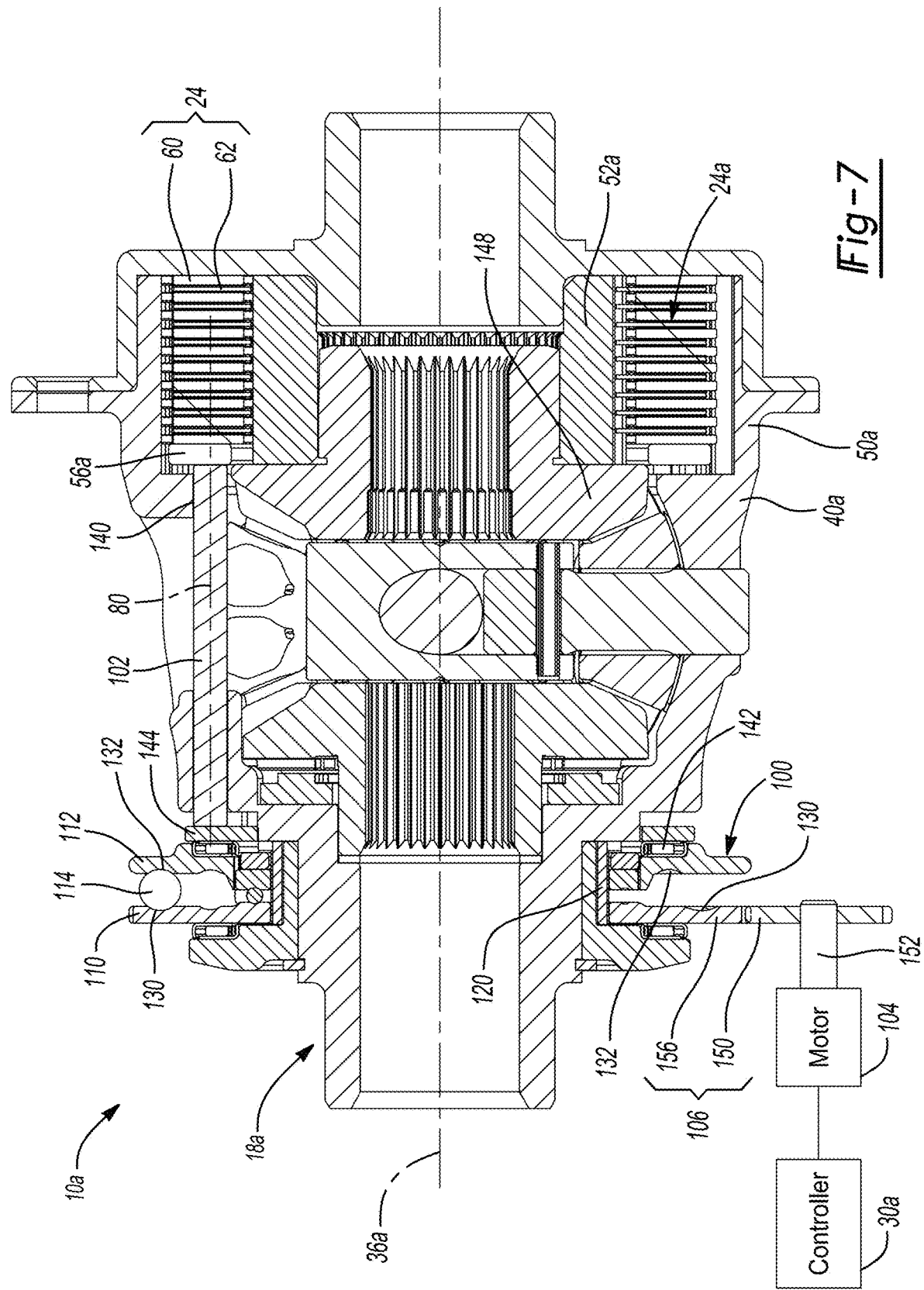
Figure 8:
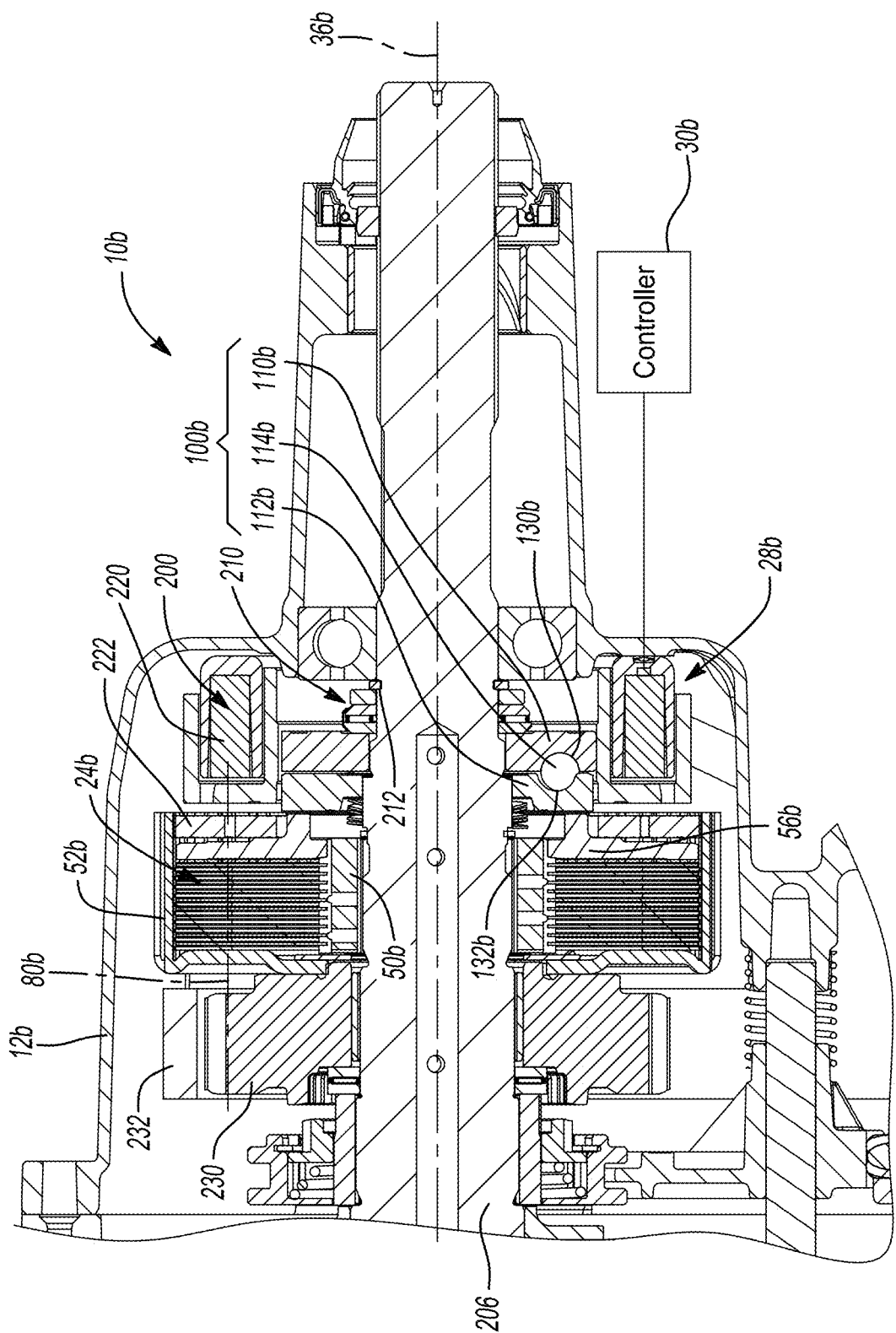

FIGS. 5A, 5B, and 5C are flowcharts of another example clutch temperature determination routine in accordance with the teachings of the present disclosure;

FIG. 6 is a flowchart of an example torque control routine in accordance with the teachings of the present disclosure;

FIG. 7 is a perspective, partly sectioned view of a second power transmission device constructed in accordance with the teachings of the present disclosure; and FIG. 8 is a section view of a portion of a third power transmission device constructed in accordance with the teachings of the present disclosure;

Corresponding reference numerals indicate corresponding parts throughout the several views of the drawings.

DETAILED DESCRIPTION

Figure 1:
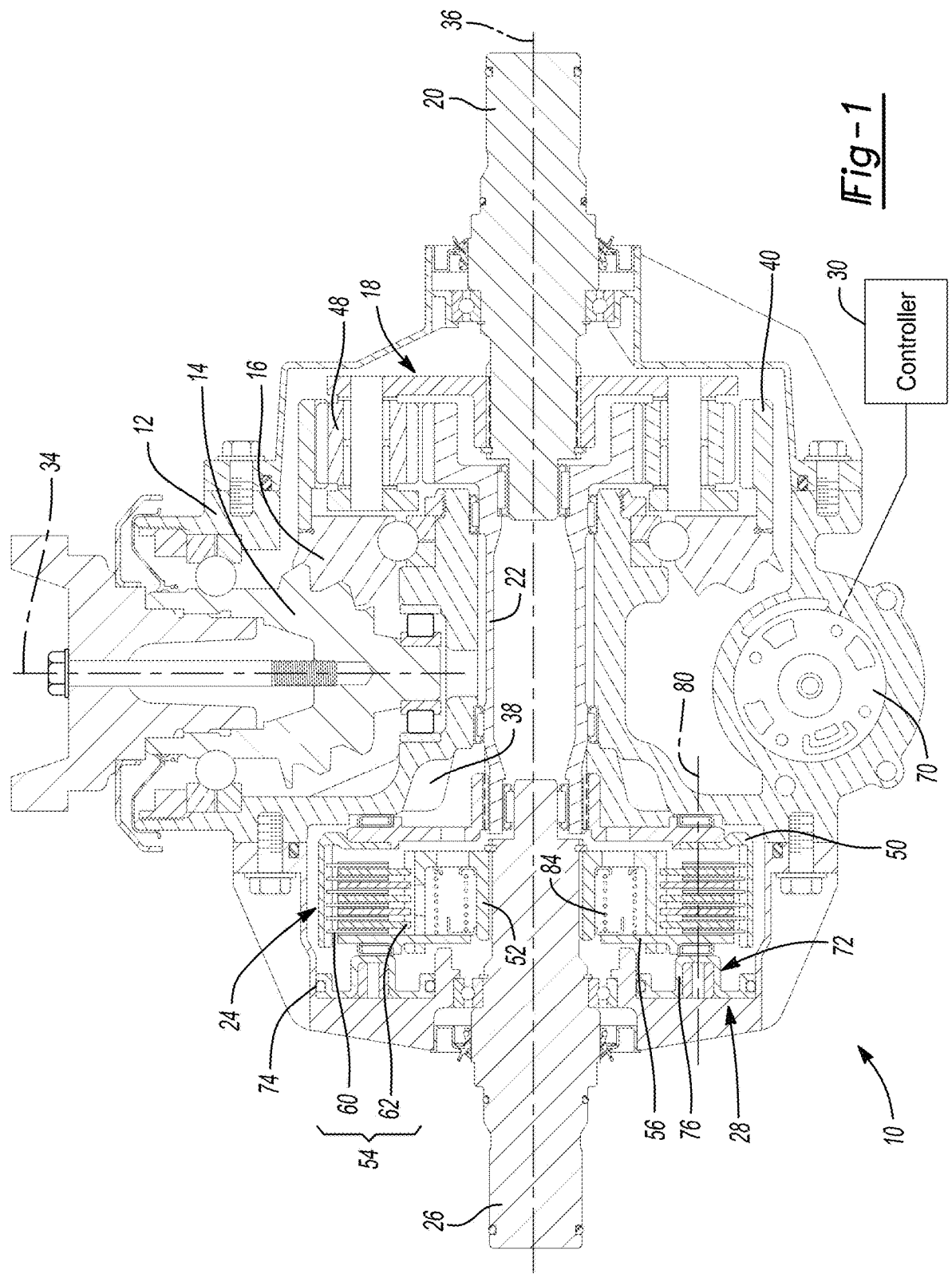
FIG. 1 is a section view of a power transmission device constructed in accordance with the teachings of the present disclosure.

With reference to FIG. 1, an exemplary power transmission device constructed in accordance with the teachings of the present disclosure is generally indicated by reference numeral 10. In the example provided, the power transmission device is an axle assembly, but it will be appreciated that the teachings of the present disclosure have application to various other types of power transmission devices, including power take-off units, differential assemblies, transfer cases, and (rotary) couplings. The power transmission device 10 can include a housing 12, an input pinion 14, a ring gear 16, a differential assembly 18, a first output shaft 20, an intermediate shaft 22, a friction clutch 24, a second output shaft 26, an actuator 28, and a controller 30.

The housing 12 defines a first rotational axis 34, a second rotational axis 36 and an internal cavity 38 into which the input pinion 14, the ring gear 16, the differential assembly 18, the intermediate shaft 22, and the friction clutch 24 are received. The input pinion 14 is rotatable about the first rotational axis 34 relative to the housing 12. The ring gear 16 is meshed with the input pinion 14 and is rotatable about the second rotational axis 36 relative to the housing 12.

The differential assembly 18 includes a differential input member 40, which is coupled to the ring gear 16 for rotation therewith about the second rotational axis 36, and first and second differential output members 42 and 44, respectively, that are rotatable about the second rotational axis 36 relative to the differential input member 40. In the particular example provide, the differential assembly 18 comprises an epicyclic or planetary gear train in which the differential input member 40 is an internal gear, the first differential output member 42 is a planet carrier, the second differential output member 44 is a sun gear, and a plurality of planet gears 48 are journally supported by the planet carrier (i.e., the first differential output member 42) and are meshingly engaged with both the internal gear (i.e., the differential input member 40) and the sun gear (i.e., the second differential output member 44). It will be appreciated, however, that the differential assembly 18 could employ straight bevel or helical gearing in the alternative.

The first output shaft 20 is rotatable about the second rotational axis 36 and is coupled to the first differential output member 42 for rotation therewith. The intermediate shaft 22 is rotatable about the second rotational axis 36 and is coupled to the second differential output member 44 for rotation therewith.

The friction clutch 24 includes a first clutch member 50, a second clutch member 52, a clutch pack 54, and an apply plate 56. In the example provided, the first clutch member 50 is an internally-splined or toothed drum and is coupled to the intermediate shaft 22 for rotation therewith, while the second clutch member 52 is an externally-splined or toothed hub and is coupled to the second output shaft 26 for common rotation about the second rotational axis 36. Accordingly, the first and second clutch members 50 and 52 functions as the input and the output, respectively, of the friction clutch 24. The clutch pack 54 conventionally includes a set of first lamella or clutch plates 60 and a set of second lamella or clutch plates 62. The first clutch plates 60 are non-rotatably but axially slidably coupled to the first clutch member 50, while the second clutch plates 62 are interleaved with the first clutch plates 60 and are non-rotatably but axially slidably coupled to the second clutch member 52. In the example provided, the first clutch plates 60 have external teeth that engage with the internal teeth of the first clutch member 50, while the second clutch plates 62 have internal teeth that engage with the external teeth that are formed on the second clutch member 52. The apply plate 56 can be non-rotatably but axially slidably coupled to one of the first and second clutch members 50 and 52. In the example provided, the apply plate 56 has an internally-splined or toothed aperture (not specifically shown) that is received over the second clutch member 52 and matingly engaged to the external teeth that are formed on the second clutch member 52.

The actuator 28 can be any type of device or mechanism for moving the apply plate 56 along the second rotational axis 36 to selectively apply or adjust a compressive force that is applied to the clutch pack 54. In the example provided, the actuator 28 includes an electric motor/pump assembly 70 and a hydraulic cylinder assembly 72. The hydraulic cylinder assembly 72 includes an annular cylinder 74, which is formed in the housing 12 concentrically about the second rotational axis 36, and an annular piston 76 that is received in the annular cylinder 74 and which is movable along the second rotational axis 36 between a first position and a second position. It will be appreciated that the annular piston 76 is the "output member" of the actuator 28 in the example provided. The electric motor/pump assembly 70 is configured with a pump (not specifically shown) that provides pressurized hydraulic fluid to the annular cylinder 74 to drive the annular piston 76 (i.e., the output member of the actuator 28) along the second rotational axis 36 from the first position to the second position. It will be appreciated that the annular piston 76, the apply plate 56 and the clutch pack 54 are disposed in a force transmission path 80 and that movement of the annular piston 76 from the first position to the second position correspondingly moves the apply plate 56 along the second rotational axis 36 so that relatively more force is transmitted through the force transmission path 80 to the clutch pack 54. In the example provided, no force is transmitted through the force transmission path 80 when the annular piston 76 is in the first position so that no or relatively little torque can be transmitted through the friction clutch 24. It will be appreciated, however, that the first position could be set or selected so that a force having a magnitude greater than zero is transmitted through the force transmission path 80 so that the friction clutch 24 is always able to transmit a pre-determined minimum torque therethrough. Optionally, the pump of the electric motor/pump assembly 70 is reversible so that it is also able to draw hydraulic fluid from the annular cylinder 74 to permit the annular piston 76 to be moved along the second rotational axis 36 into the first position (e.g., via a plurality of return springs 84).

The controller 30 is configured to determine an approximated temperature of the friction clutch 24 and to control the operation of the actuator 28 based at least on the determined temperature of the friction clutch 24. In the example provided, the controller 30 operates the electric motor/pump assembly 70 based at least on the approximated temperature of the friction clutch 24 to thereby control the force that is applied by the annular piston 76 (i.e., the output member of the actuator 28) to the apply plate 56. If desired, the actuator 28 and/or other parts of the power transmission device 10 could include one or more sensors that aid the controller 30 in its operation of the actuator 28. For example, the actuator 28 could include a pressure sensor (not shown) that senses a pressure of the fluid that is output by the electric motor/pump assembly 70 and responsively generates a pressure sensor signal. As another example, the controller 30 can be configured to determine the pressure of the fluid that is output by the electric motor/pump assembly 70 based on a rotational speed of an element of the electric motor/pump assembly 70 (e.g., the motor of the electric motor/pump assembly 70) or based on the power or current that is supplied to the electric motor of the electric motor/pump assembly 70. In yet another example, the power transmission device 10 is configured to include a temperature sensor to detect a device ambient temperature of the power transmission device, which is provided to the controller 30 for determining the approximated temperature of the friction clutch, as described herein. The approximated temperature of the friction clutch 24 may also be referred to as an "approximated clutch temperature" and the device ambient temperature may also be referred to as "ambient temperature."

The controller 30 is configured to communicate with other controller(s) and/or sensors disposed in a vehicle system having the power transmission device 10 by way of a vehicle communication network (not shown). For example, the controller 30 is configured to receive a torque from a traction system controller. In one form, the torque command may indicate a requested amount of torque to be applied to the friction clutch 24 or may include data employed by the controller 30 to determine the requested amount of torque. In another example, the controller 30 is configured to receive data indicative of a drive mode from an engine controller of the vehicle system. In another example, the controller 30 may receive data related to speed of one or more wheels of the vehicle system from an engine controller and/or from sensors disposed at the wheel(s). While specific examples are provided, the controller 30 may receive other data via the vehicle communication network.

To determine the approximated clutch temperature of the friction clutch 24, the controller 30 is configured to employ a multi-fold thermal regression model that considers multiple factors or operation variables that influence the clutch temperature. More particularly, table 1 below provides non-limiting examples of operation variables used for determining the approximated clutch temperature.

TABLE 1

Example Operation Variables

| Operation Variables | Abbreviation | Example Source |
|---|---|---|
| Torque | Trq | Amount of torque to be applied amount and can be based on a torque command |
| Wheel Speed(s) (e.g., front right wheel (frw), front left wheel (flw), rear right wheel (RRW), rear left wheel (RLW)) | S_frw S_flw S_rrw S_rlw | Wheels speeds received from vehicle network (e.g., sensor/engine controller) (collectively "wheel speeds (S_WS)") |
| Power | Pwr | Power input determined by torque and clutch slip speed (i.e., a power state) |
| Drive Mode | D_Mode | Drive mode of vehicle system (e.g., two-wheel drive (2WD), four-wheel drive (4WD), among others) received from, for example, an engine controller via vehicle network |
| Ring Gear Speed (i.e., Differential Input Speed) | S_RG | Ring gear speed determined based on wheel speeds (e.g., S_frw and S_flw) |
| Clutch Inner Basket Speed | S_CIB | Clutch inner basket speed is determined based on ring gear speed and wheel speed (e.g., S_rlw) |
| Clutch Slip Speed | S_CS | Clutch slip speed is the rotational speed difference between the first and second clutch members 50 and 52 and is determined based on clutch inner basket speed, wheel speed (e.g., S_rrw) and drive mode |
| Energy Input | E_Inp | Energy input determined based on power input and duration of a power increase |
| Device Ambient Temperature (i.e., Ambient Temperature) | T_Amb | Ambient temperature provided by a temperature sensor at the power transmission device 10 |

TABLE 1-continued

Example Operation Variables

| Operation Variables | Abbreviation | Example Source |
|---|---|---|
| Approximated Clutch Temperature At Engine Shut Off | T_ESO | Last approximated clutch temperature determined when engine is turned off or shut off (i.e., previous ignition approximated clutch temperature) |
| Initial Clutch Temperature | T_InitClutch | Initial clutch temperature determined at engine start based on engine off time and approximated clutch temperature at engine off time |

Figure 2A:
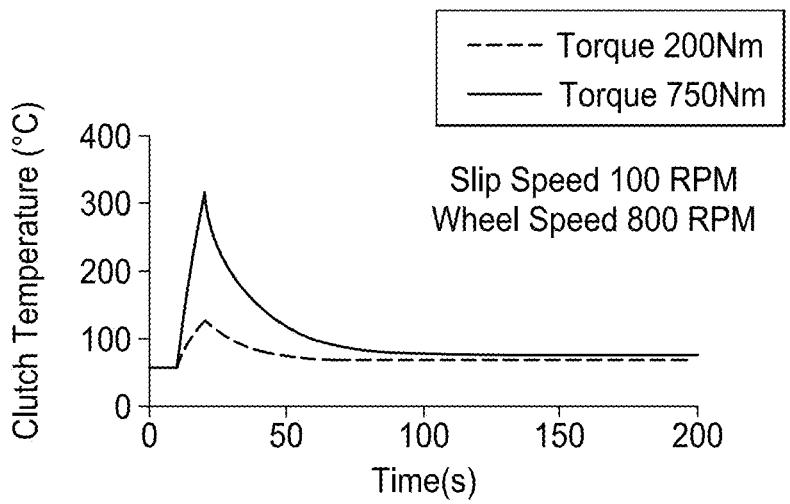
FIG. 2A is a graph illustrating a relationship of a temperature of a friction clutch over time at different torques.

In some applications, the operation variables may have a non-linear correlation with a temperature of a friction clutch (i.e., clutch temperature), which can increase the complexity of estimating the clutch temperature. For example, FIGS. 2A to 2E illustrate the effect selected operation variables have on the clutch temperature for a selected power transmission device. FIG. 2A provides the clutch temperature over time for a torque set at 200 Nm and at 750 Nm with the clutch slip speed and the wheel speed being held constant (e.g., the clutch slip speed is 100 RPM and the wheel speed is 800 RPM). The clutch temperature increases with torque, and, regardless of the torque, the clutch temperature begins to decrease, non-linearly, over time.

Figure 2B:
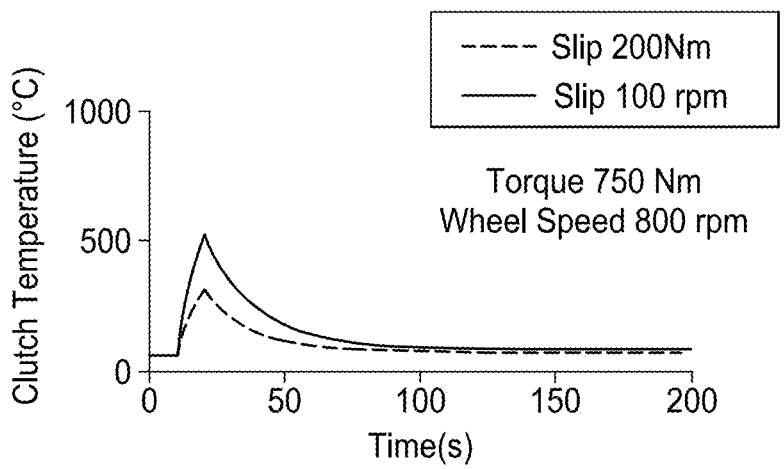
FIG. 2B is a graph illustrating relationship of the temperature of the friction clutch over time at different clutch slip speeds.

In another example, FIG. 2B provides the clutch temperature over time for a clutch slip speed of 100 Nm and of 200 Nm with a constant torque (e.g., 750 Nm) and a constant wheel speed (e.g., 800 RPM). Similar to torque, the clutch temperature increases with the clutch slip speed, and for a given clutch slip speed, the clutch temperature decreases non-linearly overtime.

Figure 2C:
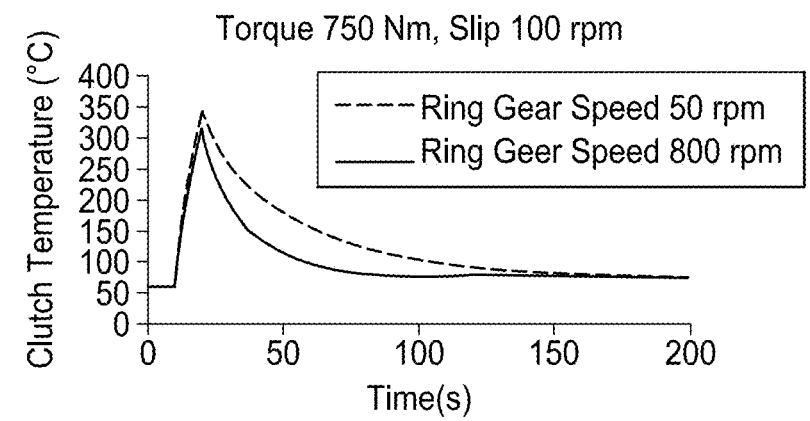
FIG. 2C is a graph illustrating a relationship of the temperature of the friction clutch over time at different ring gear speeds.

In yet another example, FIG. 2C illustrates a difference in clutch temperature for a ring gear speed of 50 RPM and of 800 RPM time with a constant torque (e.g., 750 Nm) and a constant clutch slip speed (e.g., 100 RPM). As illustrated, while the heating characteristics of the friction clutch is different at the different ring gear speeds, the cooling characteristics of the friction clutch is greater such that the friction clutch cools faster when the ring gear speed is 800 RPM than at 50 RPM. While the differential 18 includes a hypoid ring gear 18, a differential could be configured to include other types of gears such as, an annular helical gear. Accordingly, the term "ring gear speed" is not intended to limit the application of the present disclosure to a hypoid ring gear and may more generally be referred to as a differential input speed.

Figure 2D:
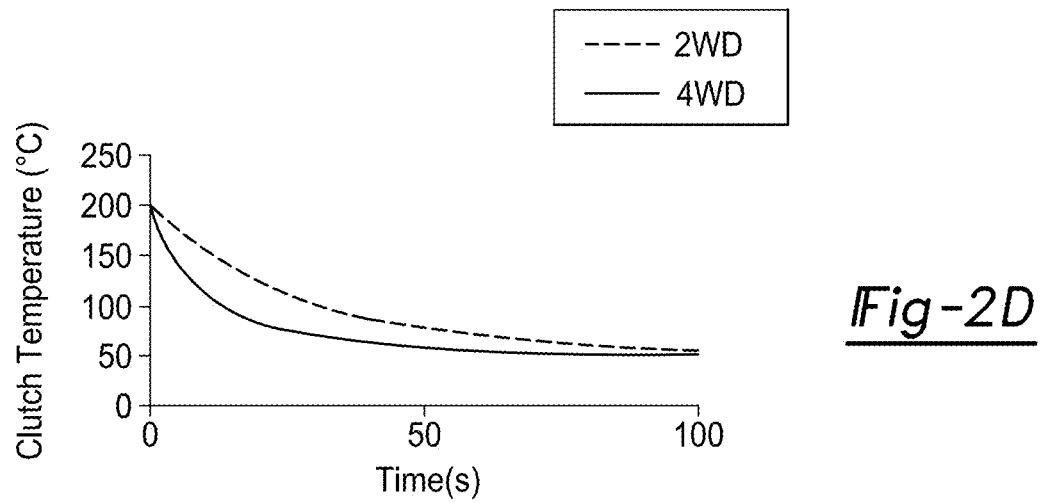
FIG. 2D is a graph illustrating relationship of the temperature of the friction clutch over time at different drive modes.
Figure 2E:
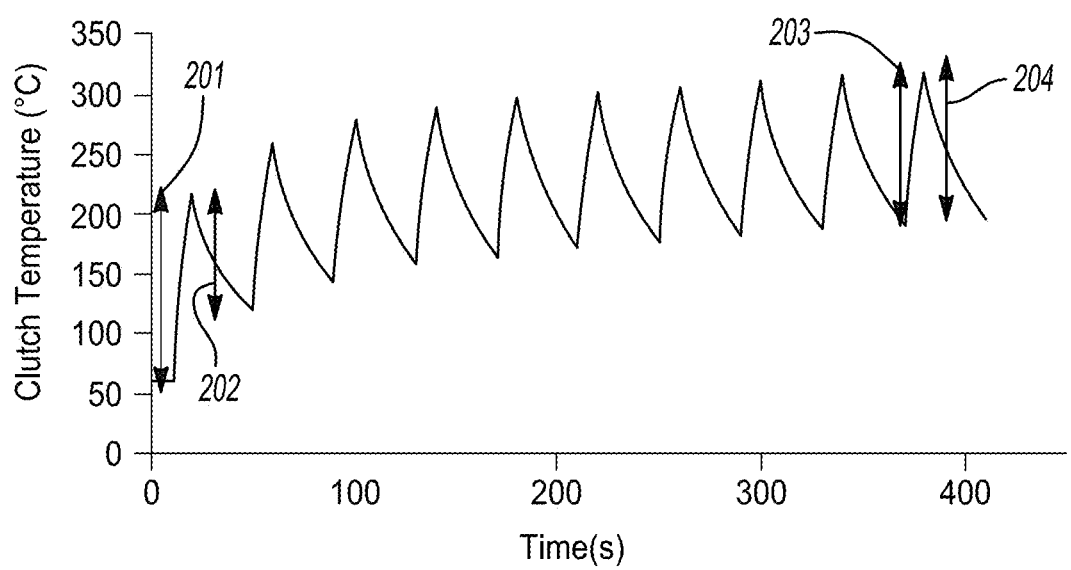
FIG. 2E is a graph illustrating the effect of the temperature of the friction clutch on a heating rate and a cooling rate of the friction clutch.

In another example, FIG. 2D illustrates a difference in the rate at which the clutch temperature cools over time when the drive mode is provided as two-wheel drive (2WD) and four-wheel drive (4WD) with the friction clutch being disengaged (i.e., torque to the friction clutch is zero). In particular, in 2WD, the plates of the friction clutch are disengaged and fully open permitting lubricant to flow through gaps between the plates. In 4WD, the plates of the friction clutch are disengaged, but may be in contact with each other reducing the amount of lubricant to flow between the plates. As illustrated in FIG. 2C, the clutch temperature for both drive modes start at 200° C., but in 2WD, the clutch temperature cools faster than in 4WD. Accordingly, the cooling characteristics of the friction clutch and thus, the clutch temperature can be dependent on the drive mode.

In some applications, some variables, which remaining constant over time, may provide a compounding effect on the clutch temperature. Specifically, the heating and/or cooling characteristics of the friction clutch may change due to successive application of a constant torque to the friction clutch. For example, referring to FIG. 2E, for successive commands, the torque applied to the friction clutch is 750 Nm, the clutch slip speed is 100 RPM, and the ring gear speed is 100 RPM. After successive commands over time, the amount of change in the clutch temperature as the friction clutch heats and cools may be different. For example, in FIG. 2E, the clutch temperature increases by about 156° C. and decreases by 91° C., as indicated by arrows 201 and 202. After some time and with the torque, the clutch slip speed, and the ring gear speed being constant, the rates at which the clutch temperature increases and decreases may begin to change, such that the clutch temperature increases by 116° C. and reduces by 112° C., as indicated by arrows 203 and 204. That is, the friction clutch may begin to heat-up slower and cool faster. Accordingly, the clutch temperature from a previous determination may be employed for a subsequent determination of the clutch temperature in the form of a feedback loop to account for the compounding effect selected operation variables may have on the clutch temperature.

It should be readily understood that the FIGS. 2A to 2E are provided for explanation purposes only and are not intended to limit the scope of the present disclosure. For instance, the operation variables employed for determining clutch temperature should not be limited to torque, clutch slip speed, ring gear speed, and drive mode. In addition, the values provided in FIGS. 2A to 2E are just examples and are not intended to be representative of ideal or even nominal response of the clutch temperature.

Figure 3:
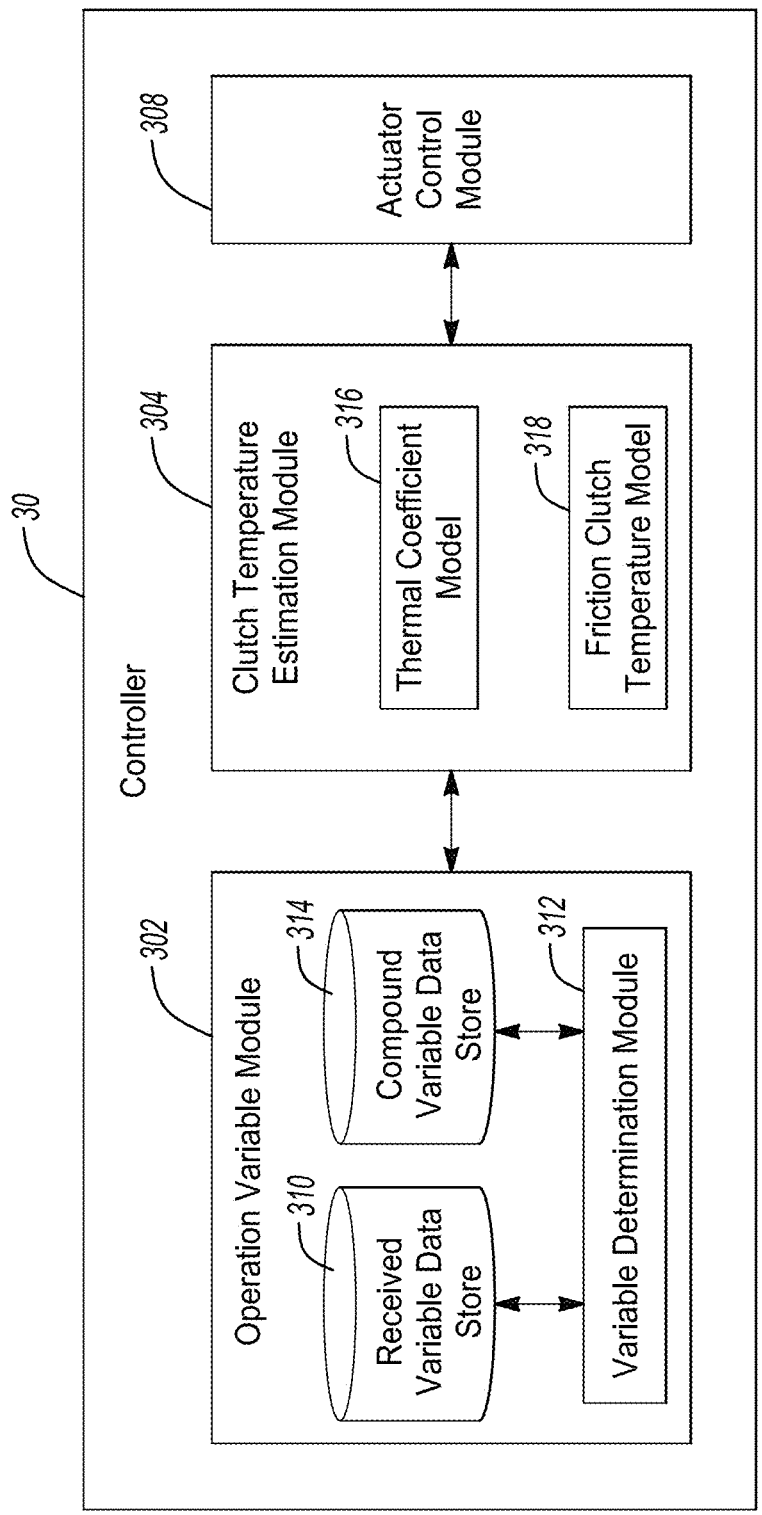
FIG. 3 is an example block diagram of a controller in accordance with the teachings of the present disclosure.

Referring to FIG. 3, an example block diagram of the controller 30 is provided. The controller 30 includes an operation variable module 302, a clutch temperature estimation module 304, and an actuator control module 308. The operation variable module 302 is configured to obtain the operation variables for determining the approximated clutch temperature. Based on the type of operation variable, the operation variable module 302 may determine the operation variable using predefined information and/or receive the operation variable from other devices (e.g., a sensor and/or other controller).

More particularly, in one form, the operation variable module 302 includes a received variable data store 310, a variable determination module 312, and a compound variable data store 314. The received variable data store 310 is configured to obtain operation variables received from the other devices, such as but not limited to, torque, drive mode (e.g., data that indicates the drive mode of the vehicle, which may include 2WD, 4WD, or other drive modes), wheel speed(s), and/or ambient temperature of the power transmission device 10, among other operation variables.

The variable determination module 312 is configured to determine various operation variables using stored information such as, but not limited to, formulas, models, and/or correlation data (e.g., correlation data may be provided in the of a look-up table). For example, the variable determination module 312 is configured to determine: power as a function of torque and clutch slip speed; ring gear speed as a function of wheel speeds of the front right wheel and the front left wheel; clutch inner basket speed as a function of the ring gear speed and the wheel speed of the rear left wheel; and clutch slip speed as a function of clutch inner basket speed, wheel speed of right rear wheel, and drive mode. The variable determination module 312 may also be configured to determine\ other operation variables, such as an initial clutch temperature and energy input, among others, and should not be limited to the examples provided herein.

The compound variable data store 314 is configured to obtain selected operation variables that influence subsequent determinations of the approximated clutch temperature. For example, the power employed for a first determination of the approximated clutch temperature is used in a subsequent determination of the approximated clutch temperature to determine if the power increased or decreased from the previous determination. Accordingly, the compound variable data store 314 obtains the power determined from a current determination of the approximated clutch temperature and provides the power for the subsequent determination. In another example, in the event the power increases, the energy generated from the increase is employed to determine the approximated temperature change for a subsequent determination in which the power decreases. It should be readily understood that the compound variable data store 314 is configured to obtain and provide different types of operation variables to be employed for subsequent determinations and should not be limited to the examples provided herein. In a non-limiting example, the received variable data store 310 and the compound variable data store 314 are provided as registers within a processor and/or a separate memory circuit.

As used herein, a "determination" of the approximated clutch temperature represents the continuous or time-based determination of the approximate clutch temperature as long as the engine is ON. In one form, the rate at which the determination is made is based on a processor clock employed by the controller 30, the rate at which other devices provide data, among other factors. In another form, the rate at which the determination can be based on a user defined cycle time.

The clutch temperature estimation module 304 is configured to determine the approximated clutch temperature employing the multi-fold thermal regression model having a thermal coefficient model 316 and a friction clutch temperature model 318. More particularly, the clutch temperature estimation module 304 is configured to determine an initial clutch temperature at an ignition cycle (i.e., when engine is turned ON) and adjust the initial clutch temperature based on an approximated temperature change determined by the multi-fold thermal regression model. Using a set of operation variables, the thermal coefficient model 316 is configured to determine values for a plurality of thermal coefficients that are provided to the friction clutch temperature model 318 to determine the approximated temperature change of the friction clutch 24.

In one form, the multi-fold thermal regression model is defined to have coefficients of the friction clutch temperature model 318 determined by another set of regression equations provided as the thermal coefficient model 316. For explanation purposes only, equation 1 represents an example of a friction clutch temperature model that is a time counter based non-linear regression equation, where Y is temperature change rate and t_cnt is a time counter reading. In equation 1, A and B are thermal coefficients, and the values of the thermal coefficients are determined by equations 2A and 2B. Equations 2A and 2B are different forms of regression equations, where x1, x2 . . . x8 represent operation variables which are either calculated or directly received, and a, b, c, d, e, f, m, n, o, p, and rare coefficients.

$$Y = A*\text{Exp}(B*t\_cnt) \qquad \text{Equation 1}$$

$$A = a*x1^2 + b*x2^2 + c*x1 + d*x2 + e*x1*x2 + f \qquad \text{Equation 2A}$$

$$B = m*x1^2 + m*x2^2 + o*x1 + p*x2 + q*x1*x2 + r \qquad \text{Equation 2B}$$

In one form, the thermal coefficient model 316 is defined using data sets representative of the effect a selected operation variable has on the temperature of the friction clutch 24. For example, data sets similar to those provided in FIGS. 2A-2E, in which the clutch temperature is provided over time and varying values of a selected operation variable, are used to define a coefficient model that correlates the selected operation variable to the clutch temperature. In a non-limiting example, the data set may be obtained through controlled experiments/tests and/or computational fluid dynamic thermal models designed to simulate relationship between various operation variables and the clutch temperature. In one form, the thermal coefficient model 316 includes a coefficient model for each operation variable from among a set of operation variables that influence the clutch temperature. Specifically, the data set for a selected operation variable from among the set of operation variables may be analyzed using known statistical tool that employ regression modeling methodologies, such a non-linear regression modeling, to define a coefficient model that captures the non-linear relationship between the selected operation variable and the clutch temperature.

The friction clutch temperature model 318 is defined based on the operation variables captured in the thermal coefficient models (e.g., 4 or more operation variables), and in some instances, correlation data. Specifically, the coefficient models for the set of operation variables are analyzed using known statistical tool that employ regression modeling methodologies to define the friction clutch temperature model 318 that outputs the approximated temperature change. In addition to data from the thermal coefficient model 316, the friction clutch temperature model 318 may employ data from predetermined correlation data such as look-up tables that correlates values of a secondary operation variable, which is not represented by the thermal coefficient model 316, with a related temperature change used to determine the approximated temperature change. For example, in lieu of having the drive mode represented in the thermal coefficient model 316, the friction clutch temperature model 318 may use a look-up table to capture the influence of the drive mode on the clutch temperature.

In one form, the thermal coefficient model 316 and the friction clutch temperature model 318 may include a power increase portion and a power decrease portion to characterize the heating and cooling characteristics of the friction clutch 24, respectfully. Specifically, the cooling & heating characteristics of the friction clutch can vary based on the values of a selected operation variable. In addition, certain operation variables may influence the clutch temperature more when torque increases than when torque decreases, or vice-versa. Accordingly, the thermal coefficient model 316 may define a thermal increase portion and a thermal decrease portion. The thermal increase portion includes a first group of coefficient models for a first group of operation variables from among the set of operation variables. The thermal decrease portion includes a second group of coefficient models for a second group of operation variables from among the set of operation variables. The first group of operation variables includes at least one operation variable that is different from that of the second group of operation variables. In a non-limiting example, the first group of operation variables may include the current power input, the ring gear speed, and the ambient temperature. In a non-limiting example, the second group of operation variables may include the ring gear speed, the ambient temperature, a clutch slip speed, a drive mode, and a desired power state change, which is a difference between the current power input and a previous power input. Accordingly, the friction clutch temperature model 318 may include a clutch temperature increase portion and a clutch temperature decrease portion. The clutch temperature increase portion determines an approximated temperature increase, as the approximated temperature change, based on data from the thermal increase portion of the thermal coefficient model 316. The clutch temperature decrease portion determines an approximated temperature decrease, as the approximated temperature change, based on data from the thermal decrease portion of the thermal coefficient model 316.

In one form, the clutch temperature estimation module 304 is configured to determine the initial clutch temperature at the start of the ignition cycle (i.e., when engine is turned on) based on the approximated clutch temperature when the engine was turned off or, in other words, at engine shut off (i.e., T_ESO), an engine off time (i.e., time period or duration that the engine has been off), and the ambient temperature of the power transmission device 10. To improve accuracy of the initial clutch temperature, the clutch temperature estimation module 304 is configured to include a temperature initialization model that is a function of the last approximated clutch temperature determined when the engine was turned off (i.e., a previous ignition) and the engine off time. Specifically, after the engine is turned off, the temperature of the friction clutch 24 begins to decrease and the longer the engine is off, the cooler the friction clutch 24 becomes. Accordingly, the initial clutch temperature at an engine shut off time of one hour is different from that of five hours. Accordingly, the initial clutch temperature may also be an operation variable. The temperature initialization model can be defined using a data set that provides the effect the approximated clutch temperature at engine shut-off and the engine off time has on the clutch temperature. Like the thermal coefficient model 316 and the friction clutch temperature model 318, the temperature initialization model can be defined using known statistical tools employing regression modeling methodologies. In lieu of a temperature initialization model, the clutch temperature estimation module 304 may employ correlation data that associates the approximated clutch temperature at engine shut-off, the engine off time, and the ambient temperature to an initial clutch temperature.

In one form, the clutch temperature estimation module 304 is configured to determine a non-engagement temperature change (i.e., $\Delta T\_NoPwr$), as an approximated temperature change, when no torque is being applied (i.e., a non-engagement state) based on a group of operation variables selected from the set of operation variables. In one form, the group of operation variables includes the ring gear speed, the clutch slip speed, the drive mode, and the ambient temperature. In an example application, the clutch temperature estimation module 304 is configured to employ a non-engagement temperature model that is regression-based model that is determined using a data set that provides the effect the ring gear speed, the clutch slip speed, the drive mode, and the ambient temperature have on the clutch temperature. In another example, the clutch temperature estimation module 304 employs correlation data such as a look-up table to determine the non-engagement temperature.

In one form, in response to receiving a torque command, the clutch temperature estimation module 304 is configured to determine whether the torque or more specifically, the power is increasing or decreasing. If the power is increasing (i.e., increase of power may be referred to as power increase state of the friction clutch 24), the clutch temperature estimation module 304 is configured to determine an approximated temperature increase ($\Delta T\_Inc$), as the approximated temperature change, based on the first group of operation variables, data indicative of a power increase duration, and the multi-fold regression thermal model (i.e., for example, the thermal increase portion of the thermal coefficient model 316 and the clutch temperature increase portion of the friction clutch temperature model 318). If the power is decreasing (i.e., decrease of power may be referred to as power decrease state of the friction clutch 24), the clutch temperature estimation module 304 is configured to determine an approximated temperature decrease ($\Delta T\_Dec$), as the approximated temperature change, based on the second group of operation variables, data indicative of a power decrease duration, and the multi-fold regression thermal model (i.e., for example, the thermal decrease portion of the thermal coefficient model 316 and the clutch temperature decrease portion of the friction clutch temperature model 318). In one form, the clutch temperature estimation module 304 uses one or more counters to track the power increase duration and the power decrease duration. In one variation, the clutch temperature estimation module 304 is configured to determine the approximated temperature increase/decrease without tracking the power increase duration or the power decrease duration.

In one form, during a power decrease, the clutch temperature estimation module 304 is configured to consider an energy input generated during a previous power increase, as an operation variable employed by the multi-fold regression model. That is, if, in a first determination, the power is increasing, the clutch temperature estimation module 304 Is configured to determine an energy input that influences the temperature of the friction clutch 24 when the power decreases. In one form, the energy input is based on the power input and the power increase duration. Accordingly, in a subsequent determination in which the power decreases, the clutch temperature estimation module 304 is configured to use the energy input to determine the approximated temperature decrease.

In one form, the clutch temperature estimation module 304 is configured to determine the approximated clutch temperature as a summation of the approximated temperature change and the ambient temperature (i.e., a contemporaneous value of a device ambient temperature). The approximated clutch temperature change in one determination is provided for a subsequent determination of the approximated temperature change and may be referred to as a cumulative temperature change ($\Delta T\_Cum$). Accordingly, the approximated clutch temperature determined by the multi-fold regression thermal model is a function of a previous approximated clutch temperature change determination.

The actuator control module 308 is configured to control operation of the actuator based at least on the approximated clutch temperature. In an example application, the actuator control module 308 is configured to execute a restricted torque mode to inhibit or reduce the occurrence of the friction clutch 24 from overheating. Specifically, the actuator control module 308 compares the approximated clutch temperature to a first temperature threshold to determine if the approximated clutch temperature is greater than the first temperature threshold. If so, the actuator control module 308 enters the restricted torque mode in which the actuator control module 308 controls the actuator to provide a first reduced torque output. The first temperature threshold is provided as a value less than a maximum permitted clutch temperature, and thus, the actuator control module 308 begins to control the actuator to address the high approximated clutch temperature. In one form, the first reduced torque output is less than a maximum torque output of the actuator (e.g., first reduced torque output <50% of maximum torque output).

In the restricted torque mode, the actuator control module 308 is configured to determine whether the approximated clutch temperature is greater than a second temperature threshold that is greater than the first temperature threshold. That is, even with the reduced torque output, the approximated clutch temperature may continue to increase. In one form, the second temperature threshold is greater than the first temperature threshold and less than or equal to the maximum permitted temperature of the friction clutch 24.

If the approximated clutch temperature is greater than the second temperature, the actuator control module 308 is configured to provide a zero-torque output until the approximate clutch temperature decreases to a value less than or equal to a third temperature threshold. In one form, the third temperature threshold is less than the first threshold. Accordingly, once the approximated clutch temperature is below or equal to the third temperature threshold, the actuator control module 308 is configured to exit the restricted torque mode and control the actuator to provide the requisite torque provided in the torque command.

In one form, in lieu of tiered torque restriction approach, the actuator control module 308 is configured to inhibit torque output once the approximated clutch temperature reaches a single temperature threshold.

Figure 4:
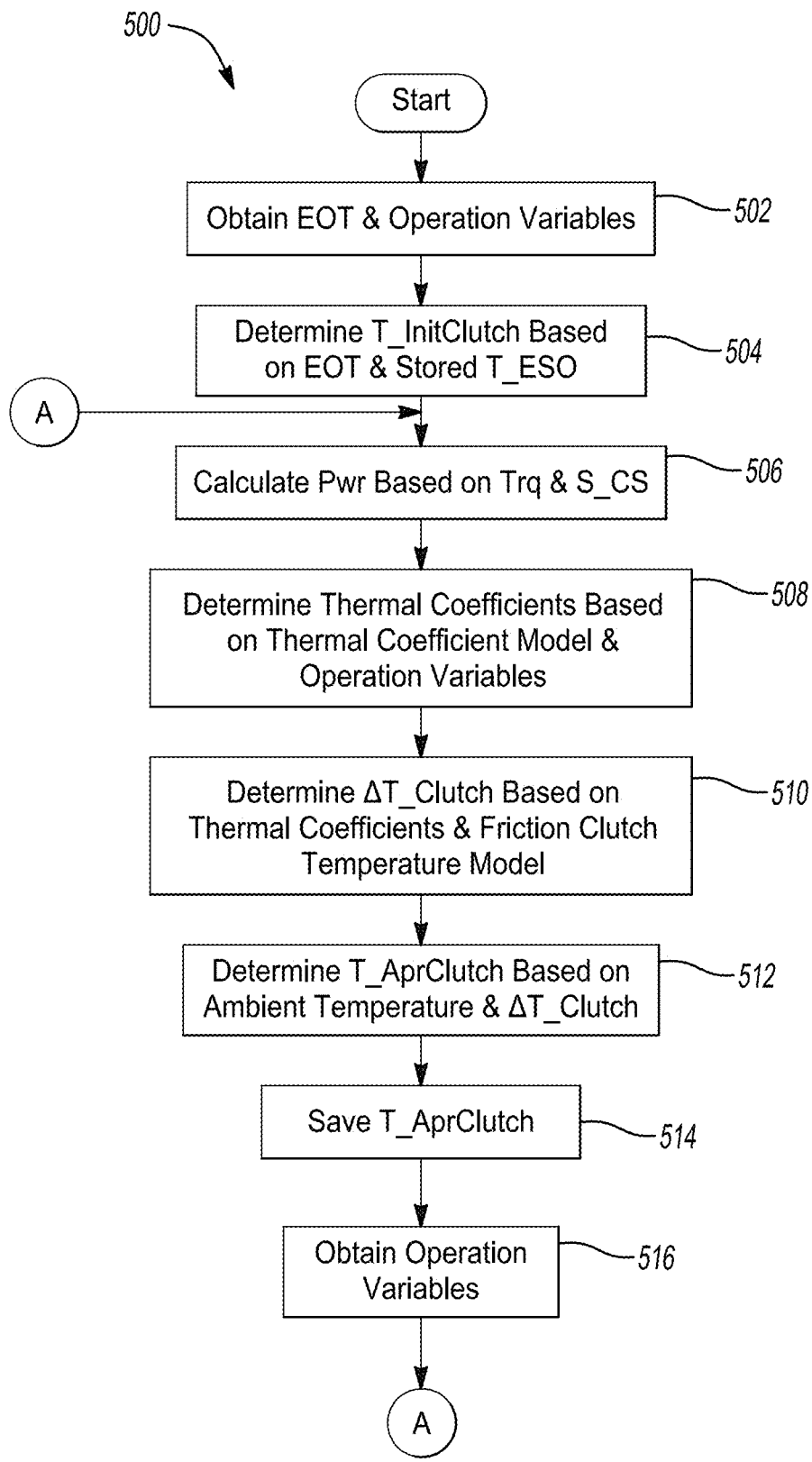
FIG. 4 is a flowchart of an example clutch temperature determination routine in accordance with the teachings of the present disclosure.

The controller 30 can be configured in various suitable ways to perform the functions described above. For example, referring to FIG. 4, an example clutch temperature determination routine 500 performed by the controller 30 is provided. In one form, the routine 500 is performed when the engine is turned ON (i.e., an ignition cycle) and the controller 30 (FIG. 3) is turned ON. At 502, the controller 30 obtains an engine off time (EOT) and current values of various operation variables such as, but not limited to: the approximated clutch temperature at the time the engine was shut off (T_ESO), wheel speeds, ambient temperature, and/or drive mode. At 504, the controller 30 determines an initial clutch temperature (T_InitClutch) based on the engine off time (EOT) and the approximated clutch temperature at engine shut off (T_ESO). At 506, the controller 30 calculates the current power input (Pwr) based on the torque (Trq) requested and to be applied to the friction clutch 24 (FIG. 1) and the clutch slip speed (S_CS) (i.e., the rotational speed difference between the first and second clutch members 50 and 52 (FIG. 1)).

At 508, the controller 30 determines values of one or more thermal coefficients based on the thermal coefficient model 316 and a set of operation variables. At 510, the controller 30 determines an approximated clutch temperature change ($\Delta$T_Clutch), which approximates a change in the approximated clutch temperature (T_AprClutch) from its previous value, based on the thermal coefficients and the friction clutch temperature model 318. At 512, the controller 30 determines an approximated clutch temperature (T_AprClutch) based on the ambient temperature (T_Amb) and the approximated clutch temperature change ($\Delta$T_Clutch) and mores specifically, as a summation of the ambient temperature (T_Amb) and the approximated clutch temperature change ($\Delta$T_Clutch).

At 514, the controller 30 stores the current value of the approximated clutch temperature (T_AprClutch) in a designated non-volatile memory and then the routine 500 returns to 502 to obtain current values of the operation variables to estimate the approximated clutch temperature. Accordingly, when the engine is turned OFF and the controller 30 is turned OFF, the value of the approximated clutch temperature (T_AprClutch) is stored and can be employed as the last approximated clutch temperature at the time the engine was shut off (T_ESO) when the engine is subsequently turned ON (i.e., new ignition cycle). At 516, the controller 30 obtains current operation variables and returns to 506 to perform a subsequent determination of the approximated clutch temperature (T_AprClutch). In one form, the routine 500 ends when the controller 30 is turned off.

Referring to FIGS. 5A to 5C, another clutch temperature determination routine is provided (i.e., clutch temperature determination routine 600). Like routine 500, the routine 600 is performed when the engine is turned ON (i.e., an ignition cycle) and the controller 30 is turned ON. At 602, the controller 30 obtains the engine off time (EOT) and current values for various operation variables such as, but not limited to: a value of the approximated clutch temperature at the time the engine was shut off (T_ESO), wheel speeds, ambient temperature, and/or drive mode.

At 604, the controller 30 determines an initial clutch temperature (T_InitClutch) based on the engine off time (EOT) and the approximated clutch temperature at the time the engine was shut off (T_ESO). At 606, the controller 30 determines a change in the clutch temperature when no torque is applied to the friction clutch 24, which may also be referred to as a no power temperature change ($\Delta$T_NoPwr), based on the initial clutch temperature (T_InitClutch) and one or more operation variables, such as but not limited to: the ring gear speed, the clutch slip speed, the ambient temperature, and the drive mode. More particularly, when the engine is first started, the friction clutch 24 is generally not engaged. However, the clutch temperature may still change due to other factors and therefore, the routine 600 takes into account possible change in the temperature of the friction clutch 24 during non-engagement. Once determined, the no power clutch temperature change ($\Delta$T_NoPwr) is provided as a cumulative temperature change ($\Delta$T_Cum) for a subsequent determination of the approximated clutch temperature. At 608, the controller 30 determines the approximated clutch temperature (T_AprClutch) based on the ambient temperature (T_Amb) and the no power temperature change ($\Delta$T_NoPwr). Specifically, the controller 30 determines the approximate clutch temperature (T_Apr- Clutch) as a summation of the ambient temperature (T_Amb) and the no power temperature change (ΔT_NoPwr).

Also, at 608, the controller 30 stores the current value of the approximated clutch temperature (T_AprClutch) in a designated non-volatile memory. Accordingly, when the engine is turned OFF and the controller 30 is turned OFF, the value of the approximated clutch temperature (T_AprClutch) is stored and can be employed as the last approximated clutch temperature at the time the engine was shut off (T_ESO) when the engine is subsequently turned ON (i.e., new ignition cycle).

At 610, the controller 30 determines if a torque command is received. If no torque command is received, the controller 30 proceeds to 612 to obtain current values of the operational variables. Since the friction clutch 24 is not being engaged, the controller proceeds to 614 to determine a no power temperature change (ΔT_NoPwr), as the approximated temperature change, based on one or more operation variables, which includes the cumulative temperature change (ΔT_Cum) from the previous determination of the approximated clutch temperature (T_AprClutch). The controller 30 then returns to 608 to determine the approximated clutch temperature (T_AprClutch).

If a torque command is received, the controller 30 proceeds to 616 to obtain current values of the operation variables. At 618, the controller 30 determines a current power input (Pwr) based on the torque (Trq) to be applied to the friction clutch 24 and the clutch slip speed (S_CS), and then determines a desired power state change (ΔPwr) (i.e., a power change) based on the current power input (Pwr) and a power input from a previous determination of the approximated clutch temperature (T_AprClutch). Specifically, if a torque command was received in the previous determination, the power input (Pwr) calculated at the previous determination is employed to determine the power change (ΔPwr) in a subsequent determination in which a torque command is also received. Accordingly, if there was no torque command in the previous determination, then the power change (ΔPwr) is equal to the power input (Pwr) determined at 618.

At 620, the controller 30 determines if the power change (ΔPwr) is greater than or equal to zero. Specifically, the controller 30 determines if the torque applied to the friction clutch 24 is increasing/unchanged or decreasing. If the torque is increasing/unchanged, the controller 30 proceeds to 622 to clear a temperature decrease counter (T_DecCnt) associated with tracking a decreasing power input (i.e., a decrease in torque to the friction clutch 24) and increments a temperature increase counter (T_IncCnt) associated with tracking an increasing-unchanging power input (i.e., an increase/unchanged amount of torque to the friction clutch 24 and generally referenced as a power increase state). Using the counters, the controller 30 can track how long the temperature of the friction clutch 24 has been decreasing or increasing. The temperature decrease counter (T_DecCnt) and the temperature increase counter (T_IncCnt) may also be referred to as a power decrease counter and a power increase counter, respectively.

At 624, the controller 30 determines values of the thermal coefficients for an increase in temperature based on the thermal coefficient model 316 and operation variables (i.e., specifically, a first group of operation variables). For example, the first group of operation variables include current power input (Pwr), the ring gear speed, the ambient temperature (T_Amb), and the cumulative temperature change (ΔT_Cum) from the previous determination. At 626, the controller 30 determines an increased temperature change (i.e., ΔT_Inc) based on the thermal coefficients and the friction clutch temperature model 318. More particularly, in one form, a thermal increase portion of the thermal coefficient model 316 and a clutch temperature increase portion of the friction clutch temperature model 318 are employed to determine the increase temperature change (ΔT_Inc).

If the controller 30 determines that the power change (ΔPwr) is less than zero (i.e., a decrease in power input indicates a decrease in torque to friction clutch 24 and a power decrease state), the controller 30 proceeds to 628 to clear the temperature increase counter (T_IncCnt) and increment the temperature decrease counter (T_DecCnt). At 630, the controller 30 determines values of the thermal coefficients for a decrease in temperature based on the thermal coefficient model 316 and one or more operation variables (i.e., specifically, a second group of operation variables). For example, the second group of operation variables include the power change (ΔPwr), the ring gear speed, the ambient temperature (T_Amb), the drive mode, and the cumulative temperature change (ΔT_Cum) from the previous determination. At 632, the controller 30 determines a decrease temperature change (i.e., ΔT_Dec) based on the values of the thermal coefficients and the friction clutch temperature model 318. More particularly, in one form, a thermal decrease portion of the thermal coefficient model 316 and a clutch temperature decrease portion of the friction clutch temperature model 318 are employed to determine the decrease temperature change (ΔT_Dec).

From 626 or 632, the controller 30 determines a cumulative temperature change (ΔT_Cum) (i.e., an approximated temperature change), which approximates a change in the approximated clutch temperature (T_AprClutch) from its previous value. The cumulative temperature change (ΔT_Cum) is employed for a subsequent determination of the approximated clutch temperature (T_AprClutch). In one form, the cumulative temperature change (ΔT_Cum) is a summation of the increase temperature change (ΔT_Inc) and the decrease temperature change (ΔT_Dec). Accordingly, if the controller 30 determines that there is an increase in torque to the friction clutch 24 and determines the increase temperature change, the decrease temperature change would be zero. Thus, the cumulative temperature change is equal to one of the increase temperature change, the decrease temperature change, or the no power temperature change. At 636, the controller 30 determines the approximated clutch temperature (T_AprClutch) based on the ambient temperature and the cumulative temperature change. Specifically, the approximated clutch temperature (T_AprClutch) is provided as a summation of the ambient temperature and the cumulative temperature change.

At 638, the controller 30 stores the current value of the approximated clutch temperature (T_AprClutch) in a designated non-volatile memory and returns to 610 to perform a subsequent determination of the approximated clutch temperature (T_AprClutch). Accordingly, when the engine is turned OFF and the controller 30 is turned OFF, the value of the approximated clutch temperature (T_AprClutch) is stored and can be employed as the last approximated clutch temperature at the time the engine was shut off (T_ESO) when the engine is subsequently turned ON (i.e., new ignition cycle). In one form, the routine 600 ends when the controller 30 is turned off.

It should be readily understood that the clutch temperature determination routines 500 and 600 can be configured in other suitable ways and should not be limited to the routines of FIGS. 4 and 5A-5C. For example, after a first determination in which the approximated clutch temperature change is an increase temperature change, a subsequent second determination, in which the torque decreases, the decrease temperature change is determined using an energy input, as an operation variable.

Referring to FIG. 6, an example torque control routine 700 performed by the controller 30 is provided. In one form, the controller 30 is configured to perform the torque control routine 700 when the controller 30 is ON and after calculating the approximated clutch temperature (T_AprClutch). At 702, the controller 30 determines if the current value of the approximated clutch temperature (T_AprClutch) is greater than or equal to a first temperature threshold (T_Th1). If the current value of the approximated clutch temperature (T_AprClutch) is less than the first temperature threshold (T_Th1), the controller 30 proceeds to 704 to control the actuator to provide torque (Trq) to the friction clutch 24 based on the torque of the torque command (Trq_Cmd). That is, the torque (Trq) applied to the friction clutch 24 is unrestricted or in other words a normal torque output based on the torque command.

If the current value of the approximated clutch temperature (T_AprClutch) is greater than or equal to the first temperature threshold (T_Th1), the controller 30 controls the torque to be applied based on a restricted torque mode. Specifically, the controller 30 proceeds to 706 to determine if the torque of the torque command (Trq_Cmd) is greater than a restricted torque output (Trq_RO). If the controller 30 determines that the torque of the torque command (Trq_Cmd) is greater than the restricted torque output (Trq_RO), the controller 30 proceeds to 708 to control the actuator to provide a reduced torque to the friction clutch 24. For example, the torque (Trq) applied is reduced to the restricted torque output (i.e., the Trq=Trq_RO), where the restricted torque output is less than the maximum permitted torque of the friction clutch 24 (Trq_Max) (e.g., Trq_RO<50%*Trq_Max). If the controller 30 determines that the torque of the torque command (Trq_Cmd) is less than the restricted torque output (i.e., Trq_RO), the controller 30 proceeds to 710 to control the actuator to apply the torque of the torque command (Trq_Cmd) to the friction clutch 24 (i.e., Trq=Trq_Cmd).

As described above, the controller 30 recalculates the approximated clutch temperature until the controller 30 is turned OFF, and once in the restricted torque mode, the controller 30 continues to evaluate the approximated clutch temperature in the restricted torque mode until the approximated clutch temperature decreases to a value less than or equal to a third temperature threshold. Specifically, the controller 30 proceeds to 712 to determine if a current value of the approximated clutch temperature (T_AprClutch) is greater than or equal to a second temperature threshold (T_Th2), which is greater than the first temperature threshold (T_Th1). If the approximated clutch temperature (T_AprClutch) is greater than or equal to the second temperature threshold (T_Th2), the controller 30 proceed to 714 to inhibit torque output (i.e., Trq=0). After a no torque output or if the approximated clutch temperature (T_AprClutch) is less than the second temperature threshold (T_Th2), the controller 30 proceeds to 716 to determine if the approximated clutch temperature (T_AprClutch) is less than or equal to a third temperature threshold (T_Th3), which is less than the first temperature threshold (T_Th1). If the approximated clutch temperature (T_AprClutch) is not less than the third temperature threshold (T_Th3), the controller 30 remains in the restricted torque mode by returning to 712. If the approximated clutch temperature (T_AprClutch) is less than or equal to the third temperature threshold (T_Th3), the controller 30 exits the restricted torque mode and proceed to 704 of the routine 700 to provide the torque provided in the torque command to the clutch (i.e., Trq=TrqCmd). More particularly, once the approximated clutch temperature (T_AprClutch) is greater than the second temperature threshold (T_Th2), the friction clutch 24 is not engaged until the approximated clutch temperature (T_AprClutch) is less than or equal to the third temperature threshold (T_Th3), which is less than the first temperature threshold (T_Th1). In one form, the routine 700 ends when the controller 30 is turned off.

It should be readily understood that the torque control routine 700 can be configured in other suitable ways and should not be limited to the routine of FIG. 6. For example, in lieu of tiered torque restriction approach, the controller 30 may inhibit torque output once the approximated clutch temperature reaches a defined temperature threshold.

While the actuator 28 has been illustrated and described as having an output member that is moved along the second rotational axis 36 in response to the application of fluid pressure, it will be appreciated that the actuator could be configured differently.

In FIG. 7, the power transmission device 10a includes a differential assembly 18a, and the actuator 28a includes a ball-ramp mechanism 100, a plurality of pins 102, an electric motor 104 and an actuator gear train 106. The ball-ramp mechanism 100 is conventional in that it includes a first ball-ramp ring 110, a second ball-ramp ring 112 and a plurality of balls 114. The first ball-ramp ring 110 is disposed on a bushing 120 that is mounted on the differential input member 40a (i.e., a differential case in the example shown) of the differential assembly 18a. The bushing 120 permits the first ball-ramp ring 110 to rotate relative to the differential case 40a about a rotational axis 36a of the differential case 40a. The second ball-ramp ring 112 is non-rotatably but axially slidably disposed on the bushing 120 and as such is rotatable about and axially movable along the rotational axis 36a relative to the differential case 40a. Each of the balls 114 is received into a pair of ball tracks 130 and 132 that are formed in the first and second ball-ramp rings 110 and 112, respectively. Each of the ball tracks 130 and 132 taper in their depth in a circumferential direction. Each of the pins 102 is received in an associated pin bore 140 that is formed longitudinally through the differential case 40a. The pin bores 140 (and thereby the pins 102) are spaced circumferentially about the rotational axis 36a of the differential case 40a. A thrust bearing 142 and a thrust washer 144 are disposed between the second ball-ramp ring 112 and a first axial end of the pins 102, while the second, opposite axial end of the pins 102 abuts the apply plate 56a of the friction clutch 24a. In this example, the first clutch member 50a is unitarily and integrally formed with the differential case 40a, while the second clutch member 52a is non-rotatably coupled to a side gear 148 (i.e., a differential output member). The actuator gear train 106 includes an input gear 150, which is coupled to a motor output shaft 152 of the electric motor 104 for rotation therewith, and an output gear 156 that is coupled to the first ball-ramp ring 110 for common rotation about the rotational axis 36a of the differential assembly 18a. In the example provided, the input gear 150 meshingly engages the output gear 156, but it will be appreciated that the actuator gear train 106 could employ one or more additional gears between the input gear 150 and the output gear 156. The electric motor 104 is selectively operable to rotate the first ball-ramp ring 110 to cause corresponding rotational movement of the balls 114 in the ball tracks 130 and 132 between deep ends and shallow ends of the ball tracks 130 and 132. Positioning of the balls 114 in the deep ends of the ball tracks 130 and 132, the second ball-ramp ring 112 is spaced from the first ball-ramp ring 110 along the rotational axis 36a by a first distance, while position of the balls 114 in the shallow ends of the ball tracks 130 and 132 spaces the second ball-ramp ring 112 from the first ball-ramp ring 110 along the rotational axis 36a by a second distance that is greater than the first distance. Accordingly, the electric motor 104 can be operated to rotate the first ball-ramp ring 110 and selectively position the pins 102 (i.e., the output members of the actuator 28a in the example provided) along the rotational axis 36a between a first position (corresponding to the placement of the balls 114 in the deep ends of the ball tracks 130 and 132) and a second position (corresponding to the placement of the balls 114 in the shallow ends of the ball tracks 130 and 132) to control the force that is transmitted through the force transmission path 80a to the clutch pack 54a. The controller 30a is configured to determine an approximated temperature of the friction clutch 24a and to control the operation of the actuator 28a based at least on the determined temperature of the friction clutch 24a. In the example provided, the controller 30a operates the electric motor 104 based at least on the approximated temperature of the friction clutch 24a to thereby control the force that is applied by the pins 102 (i.e., the output member of the actuator 28a) to the apply plate 56a.

The controller 30a is configured to determine an approximated temperature of the friction clutch 24a and to control the operation of the actuator 28a based at least on the determined temperature of the friction clutch 24a. The controller 30a is configured in a similar manner as that of controller 30, and thus, the description of controller 30a is omitted for purposes brevity.

In FIG. 8, the power transmission device 10b is a transfer case, and the actuator 28b includes a ball-ramp mechanism 100b and an electromagnet 200. The ball-ramp mechanism 100b is conventional in that it includes a first ball-ramp ring 110b, a second ball-ramp ring 112b and a plurality of balls 114b. The first ball-ramp ring 110b is disposed on a rear output shaft 206 of the transfer case 10b. The first ball-ramp ring 110b is coupled to the rear output shaft 206 for rotation therewith about the rotational axis 36b of the rear output shaft 206. A thrust bearing 210 and a retaining ring 212 limit axial movement of the first ball-ramp ring 110b along the rotational axis 36b in a direction that is opposite the friction clutch 24b. The second ball-ramp ring 112b is mounted on the rear output shaft 206 in a manner that permits both relative rotation about the rotational axis 36b and axial movement along the rotational axis 36b relative to the rear output shaft 206. Each of the balls 114b is received into a pair of ball tracks 130b and 132b that are formed in the first and second ball-ramp rings 110b and 112b, respectively. The ball tracks 130b and 132b taper in their depth in a circumferential direction. The electromagnet 200 includes an electromagnet coil 220 and an armature 222. The electromagnet coil 220 is fixedly coupled to the housing 12b of the transfer case 10b and is selectively operable for generating a magnetic field. The armature 222 is non-rotatably but axially slidably coupled to the second clutch member 52b (i.e., to the output member of the friction clutch 24b). In the example provided, the armature 222 includes a plurality of external teeth (not specifically shown) that matingly engage a plurality of internal teeth (not specifically shown) that are formed on the second clutch member 52b. The first clutch member 50b is rotationally coupled to the rear output shaft 206, while the second clutch member 52b is rotationally coupled to a sprocket 230 that is engaged to a chain 232. The chain 232 is engaged to a second sprocket (not shown) that is rotationally coupled to a front output shaft (not shown). The electromagnet coil 220 can be energized to create a magnetic field that acts on the armature 222 to move the armature 222 along the rotational axis 36b (relative to the second clutch member 52) into engagement with the second ball-ramp ring 112b. Torsional resistance or drag on the second clutch member 52b, which results from components such as the chain 232 and the front output shaft, is transmitted from the armature 222 to the second ball-ramp ring 112b and causes the second ball-ramp ring 112 to rotate about the rotational axis 36b relative to the first ball-ramp ring 110b and cause corresponding rotational movement of the balls 114b in the ball tracks 130b and 132b (i.e., from their deep ends to their shallow ends). Positioning of the balls 114b in the deep ends of the ball tracks 130b and 132b spaces the second ball-ramp ring 112b apart from the first ball-ramp ring 110b along the rotational axis 36b by a first distance (i.e., at a first position), while positioning of the balls 114b in the shallow ends of the ball tracks 130b and 132b spaces the second ball-ramp ring 112b from the first ball-ramp ring 110b along the rotational axis 36b by a second distance (i.e., at a second position). The second distance is greater than the first distance. The second ball-ramp ring 112b, which is the output member of the actuator 28b in the example provided, contacts the apply plate 56b as it moves from the first position to the second position. Accordingly, the electromagnet coil 220 can be operated to control the force that is transmitted through the force transmission path 80b to the clutch pack 54b. The controller 30b is configured to determine an approximated temperature of the friction clutch 24b and to control the operation of the actuator 28b based at least on the determined temperature of the friction clutch 24b. In the example provided, the controller 30b operates the electromagnet coil 220 based at least on the approximated temperature of the friction clutch 24b to thereby control the force that is applied by the second ball-ramp ring 112b (i.e., the output member of the actuator 28b) to the apply plate 56b.

The controller 30b is configured to determine an approximated temperature of the friction clutch 24b and to control the operation of the actuator 28b based at least on the determined temperature of the friction clutch 24b. The controller 30b is configured in a similar manner as that of controller 30, and thus, the description of controller 30b is omitted for purposes brevity.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used herein, the phrases "at least one of A, B, and C" should be construed to mean a logical (A OR B OR C), using a non-exclusive logical OR, and should not be construed to mean "at least one of A, at least one of B, and at least one of C." As used herein, the term "and/or" includes any and all combinations of one or more of the associated listed items.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A power transmission device comprising:
    a friction clutch having a clutch pack and an apply plate, the apply plate being movable along an axis;
    an actuator with an output member that is movable along the axis between a first position and a second position, wherein the output member, the apply plate and the clutch pack are disposed in a force transmission path, wherein the output member is movable along the axis from the first position to the second position to apply relatively more force through the force transmission path onto the clutch pack; and
    a controller configured to:
        determine a current power state of the friction clutch,
        determine a desired power state change based on the current power state and a previous power state,
        determine a plurality of thermal coefficients based on a thermal coefficient model, the desired power state change, and a set of operation variables, wherein the plurality of thermal coefficients are indicative of at least two operation variables in the set of operation variables, and the at least two operation variables have a non-linear thermal influence on thermal properties of the friction clutch,
        determine an approximated temperature change of the friction clutch based on the thermal coefficients and a friction clutch temperature model,
        determine an approximated clutch temperature based on the approximated temperature change and a contemporaneous value of a device ambient temperature, and
        control operation of the actuator based at least on the approximated clutch temperature.

2. The power transmission device of claim 1, wherein the friction clutch temperature model and the thermal coefficient model are based on regression modeling methodology.

3. The power transmission device of claim 1, wherein the set of operation variables includes a torque, a clutch slip speed, a differential input speed, a drive mode, the device ambient temperature, and a previous ignition approximated clutch temperature.

4. The power transmission device of claim 1, wherein the controller is configured to determine an initial clutch temperature at an ignition cycle based on a previous ignition approximated clutch temperature, an engine off time, and the device ambient temperature, wherein the approximated clutch temperature is further based on the initial clutch temperature.

5. The power transmission device of claim 4, wherein the controller is configured to determine the initial clutch temperature employing a temperature initialization model, wherein the temperature initialization model is based on a regression modeling methodology.

6. The power transmission device of claim 4, wherein the controller is configured to determine:
    determine whether the current power state is zero, and
    determine a non-engagement temperature change from the initial clutch temperature in response to the current power state being zero, wherein the non-engagement temperature change is determined based on a non-engagement temperature model and a group of operation variables selected from among the set of operation variables.

7. The power transmission device of claim 6, wherein the group of operation variables includes a differential input speed, a clutch slip speed, a drive mode, and the device ambient temperature.

8. The power transmission device of claim 1, wherein the controller is configured to:
determine whether the desired power state change indicates a power increase state or a power decrease state,
increment a temperature increase counter in response to the desired power state change being the power increase state,
increment a temperature decrease counter in response to the desired power state change being the power decrease state,
determine, as the approximated temperature change, an approximated temperature increase based on a value of the temperature increase counter, a first group of operation variables in response to the desired power state change indicating the power increase state, wherein the set of operation variables includes the first group of operation variables, and
determine, as the approximated temperature change, an approximated temperature decrease based on a value of the temperature decrease counter, a second group of operation variables in response to the desired power state change indicating the power decrease state, wherein the set of operation variables includes the second group of operation variables, wherein first group of operation variables includes at least one operation variable that is different from that of the second group of operation variables.

9. The power transmission device of claim 8, wherein:
the first group of operation variables includes the current power state, a differential input speed, and the device ambient temperature, and
the second group of operation variables includes the desired power state change, the differential input speed, the device ambient temperature, a clutch slip speed, and a drive mode.

10. The power transmission device of claim 8, wherein the controller is configured to:
determine an energy input in response to the desired power state change indicating the power increase state, wherein the energy input is based on the current power state and the value of the temperature increase counter, and
for a subsequent determination, employ the energy input to determine the approximated temperature decrease in response to the desired power state change indicating the power decrease state in the subsequent determination.

11. The power transmission device of claim 1, wherein the controller is configured to store the approximated temperature change, as a previous approximated temperature change, and determine a subsequent approximated temperature change based on the previous approximated temperature change.

12. The power transmission device of claim 1, wherein the controller is configured to determine the approximated clutch temperature based on a previous approximated temperature change from a preceding determination of the approximated clutch temperature.

13. The power transmission device of claim 1, wherein the controller is configured to:
determine whether the approximated clutch temperature is greater than a first temperature threshold, and
control the actuator to provide a restricted torque output in response to the approximated clutch temperature being greater than the first temperature threshold, wherein the restricted torque output is less than a maximum torque output of the actuator.

14. The power transmission device of claim 13, wherein the controller is configured to:
determine whether the approximated clutch temperature is greater than a second temperature threshold, wherein the second temperature threshold is greater than the first temperature threshold, and
control the actuator to provide a zero-torque output in response to the approximated clutch temperature being greater than the second temperature threshold.

15. The power transmission device of claim 14, wherein the controller is configured to:
determine whether the approximated clutch temperature is less than or equal to a third temperature threshold, wherein the third temperature threshold is less than the first temperature threshold, and
control the actuator to a normal torque output in response to the approximated clutch temperature being less than or equal to the third temperature threshold, wherein the normal torque output is based on a torque command.

16. A power transmission device comprising:
a friction clutch having a clutch pack and an apply plate, the apply plate being movable along an axis;
an actuator with an output member that is movable along the axis between a first position and a second position, wherein the output member, the apply plate and the clutch pack are disposed in a force transmission path, wherein the output member is movable along the axis from the first position to the second position to apply relatively more force through the force transmission path onto the clutch pack; and
a controller configured to:
determine a current power state of the friction clutch,
determine an initial clutch temperature at an ignition cycle based on a previous ignition approximated clutch temperature, an engine off time, and a device ambient temperature,
determine whether the current power state is zero,
determine a non-engagement temperature change from the initial clutch temperature in response to the current power state being zero, wherein the non-engagement temperature change is an approximated temperature change,
in response to the current power state not being zero,
determine a desired power state change based on the current power state and a previous power state in response to the current power state not being zero,
determine a plurality of thermal coefficients based on a thermal coefficient model, the desired power state change, and a set of operation variables, wherein the plurality of thermal coefficients are indicative of at least two operation variables in the set of operation variables, and the at least two operation variables have a non-linear thermal influence on thermal properties of the friction clutch, and
determine an approximated temperature change of the friction clutch based on the thermal coefficients and a friction clutch temperature model,
determine an approximated clutch temperature based on the approximated temperature change and a contemporaneous value of a device ambient temperature, and control operation of the actuator based at least on the approximated clutch temperature.

17. The power transmission device of claim 16, wherein the controller is configured to, in response to the power not being zero:
- determine whether the desired power state change indicates a power increase state or a power decrease state,
- increment a temperature increase counter in response to the desired power state change being the power increase state,
- increment a temperature decrease counter in response to the desired power state change being the power decrease state,
- determine, as the approximated temperature change, an approximated temperature increase based on a value of the temperature increase counter, a first group of operation variables in response to the desired power state change indicating the power increase state, wherein the set of operation variables includes the first group of operation variables, and
- determine, as the approximated temperature change, an approximated temperature decrease based on a value of the temperature decrease counter, a second group of operation variables in response to the desired power state change indicating the power decrease state, wherein the set of operation variables includes the second group of operation variables, wherein first group of operation variables includes at least one operation variable that is different from that of the second group of operation variables.

18. The power transmission device of claim 17, wherein:
the first group of operation variables includes the current power state, a differential input speed, and the device ambient temperature, and
the second group of operation variables includes the desired power state change, the differential input speed, the device ambient temperature, a clutch slip speed, and a drive mode.

19. The power transmission device of claim 16, wherein the controller is configured to:
- determine whether the approximated clutch temperature is greater than a first temperature threshold, and
- control the actuator to provide a restricted torque output in response to the approximated clutch temperature being greater than the first temperature threshold, wherein the restricted torque output is less than a maximum torque output of the actuator.

20. The power transmission device of claim 19, wherein the controller is configured to:
- determine whether the approximated clutch temperature is greater than a second temperature threshold, wherein the second temperature threshold is greater than the first temperature threshold,
- control the actuator to provide a zero-torque output in response to the approximated clutch temperature being greater than the second temperature threshold,
- determine whether the approximated clutch temperature is less than or equal to a third temperature threshold in response to the approximated clutch temperature being less than the second temperature threshold, wherein the third temperature threshold is less than the first temperature threshold, and
- control the actuator to a normal torque output in response to the approximated clutch temperature being less than or equal to the third temperature threshold, wherein the normal torque output is based on a torque command.

* * * * *